United States Patent
Denzer

(10) Patent No.: US 10,464,158 B2
(45) Date of Patent: Nov. 5, 2019

(54) CLEANING APPARATUS FOR A MECHANICAL CLEANING OF A GAS NOZZLE OF A PROTECTIVE GAS WELDING BURNER

(71) Applicant: AUDI AG, Ingolstadt (DE)

(72) Inventor: Klaus Denzer, Weinsberg (DE)

(73) Assignee: AUDI AG, Ingolstadt (DE)

( * ) Notice: Subject to any disclaimer, the term of this patent is extended or adjusted under 35 U.S.C. 154(b) by 86 days.

(21) Appl. No.: 15/544,818

(22) PCT Filed: Dec. 19, 2015

(86) PCT No.: PCT/EP2015/002568
§ 371 (c)(1),
(2) Date: Jul. 19, 2017

(87) PCT Pub. No.: WO2016/119809
PCT Pub. Date: Aug. 4, 2016

(65) Prior Publication Data
US 2018/0015562 A1    Jan. 18, 2018

(30) Foreign Application Priority Data
Jan. 31, 2015    (DE) .................. 10 2015 001 246

(51) Int. Cl.
*B23K 9/32*    (2006.01)
*B05B 15/52*    (2018.01)
(Continued)

(52) U.S. Cl.
CPC .............. *B23K 9/328* (2013.01); *A46B 9/005* (2013.01); *A46B 13/001* (2013.01); *B05B 15/52* (2018.02);
(Continued)

(58) Field of Classification Search
CPC .. B23K 37/00; B23K 37/0276; B23K 33/022; B23K 33/105; B23K 9/328; F23D 14/50
(Continued)

(56) References Cited

U.S. PATENT DOCUMENTS 2,196,942 A * 4/1940 Roberts .................... B24D 9/02
15/104.05
2,279,922 A * 4/1942 Kraner ...................... F28G 3/14
125/5
(Continued)

FOREIGN PATENT DOCUMENTS

AU         641271 B2    9/1993
CN         1292736 A    4/2001
(Continued)

OTHER PUBLICATIONS

DE202007014659U1 Translation, Espacenet, Nov. 20, 2018 (Year: 2018).*

(Continued)

*Primary Examiner* — Sean K. Hunter
*Assistant Examiner* — Thomas Raymond Rodgers
(74) *Attorney, Agent, or Firm* — Maier & Maier, PLLC

(57) ABSTRACT

A cleaning device for a mechanical cleaning of a gas nozzle of a protective gas welding burner, provided with a controlled, rotatably driven cleaning head having at least one co-rotating cleaning element, and with a supplying and centering apparatus for a coaxial positioning of the gas nozzle with respect to the axis of rotation of the cleaning head in the region of at least one cleaning element. The cleaning head has two cleaning arms creating a scissors-form with the cleaning arms, which are suspended in a freely swinging manner on a pivot bearing arranged transversely to the axis of rotation in the cleaning head. Respective centrifugal weights are arranged on the cleaning arms on the (Continued)

lower regions facing away from the gas nozzle, so that the cleaning scissors are spread apart with a rotation of the of the cleaning head.

12 Claims, 6 Drawing Sheets

(51) Int. Cl.
  *B08B 9/02* (2006.01)
  *F23D 14/50* (2006.01)
  *B08B 1/04* (2006.01)
  *B05B 15/522* (2018.01)
  *A46B 9/00* (2006.01)
  *A46B 13/00* (2006.01)
  *B08B 1/00* (2006.01)
  *B08B 9/027* (2006.01)

(52) U.S. Cl.
  CPC ............ *B05B 15/522* (2018.02); *B08B 1/002* (2013.01); *B08B 1/005* (2013.01); *B08B 1/04* (2013.01); *B08B 9/021* (2013.01); *B08B 9/027* (2013.01); *F23D 14/50* (2013.01); *A46B 2200/3013* (2013.01)

(58) Field of Classification Search
  USPC ................ 15/93.1, 104.011, 104.03, 104.05, 15/104.095, 111, 236.03; 30/104
  See application file for complete search history.

(56) References Cited

U.S. PATENT DOCUMENTS

| | | | | |
|---|---|---|---|---|
| 2,551,875 A * | 5/1951 | Cotton | ...................... | B08B 1/00 131/246 |
| 3,519,047 A * | 7/1970 | Elson | .................... | A47J 19/027 241/278.1 |
| 4,577,406 A * | 3/1986 | Idzik | ...................... | B23D 21/14 30/103 |
| 4,702,195 A * | 10/1987 | Thielmann | ............... | B23K 9/32 118/72 |
| 4,891,115 A * | 1/1990 | Shishkin | ............... | B08B 9/0553 134/166 C |
| 5,168,660 A * | 12/1992 | Smith | ..................... | B08B 9/021 15/104.04 |
| 5,221,826 A * | 6/1993 | Lee | ........................... | B23K 9/32 15/93.1 |
| 5,686,000 A * | 11/1997 | Nilsson | ..................... | B23K 9/32 15/93.1 |
| 5,809,603 A * | 9/1998 | White | ..................... | B08B 9/021 15/104.04 |
| 5,845,357 A | 12/1998 | Anderson | | |
| 6,167,893 B1 * | 1/2001 | Taatjes | .............. | H01L 21/68728 134/147 |
| 2003/0054743 A1 * | 3/2003 | Negley | ................... | B24B 33/08 451/465 |
| 2005/0150114 A1 * | 7/2005 | Harvey | .................. | B26B 13/08 30/131 |
| 2006/0130251 A1 * | 6/2006 | Bourrelly | ................ | B08B 9/021 15/104.09 |
| 2009/0249567 A1 * | 10/2009 | Nakazima | ................ | B23K 9/32 15/104.095 |
| 2016/0130899 A1 * | 5/2016 | Cronley | ................ | E21B 29/005 166/298 |

FOREIGN PATENT DOCUMENTS

| | | | | |
|---|---|---|---|---|
| DE | 3244993 A1 | | 6/1984 | |
| DE | 202007014659 U1 * | | 12/2007 | ............... B08B 1/04 |
| DE | 202007014659 U1 | | 12/2007 | |
| EP | 0090233 A1 * | | 10/1983 | ............... B23K 9/32 |
| EP | 0090233 A1 | | 10/1983 | |
| EP | 0090233 B1 | | 6/1987 | |
| WO | 9205007 A1 | | 4/1992 | |

OTHER PUBLICATIONS

Chinese Office Action dated Apr. 23, 2018, in connection with corresponding Chinese application No. 201580074859.X (6 pgs.).
Notification of Transmittal of Translation of the International Preliminary Report on Patentability dated Aug. 10, 2017, in connection with corresponding international application No. PCT/EP2015/002568 (6 pgs.).
Examination Report dated Oct. 8, 2015 of corresponding German application No. 102015001246.0; 4 pgs.
International Search Report dated Mar. 23, 2016 of corresponding International application No. PCT/EP2015/002568; 10 pgs.

* cited by examiner

CLEANING APPARATUS FOR A MECHANICAL CLEANING OF A GAS NOZZLE OF A PROTECTIVE GAS WELDING BURNER

FIELD

The invention relates to a cleaning apparatus for a mechanical cleaning of a gas nozzle of a protective gas welding burner, in particular a CMT+burner.

BACKGROUND

A protective gas welding torch for a known apparatus for cleaning (EP 0 090 233 B1) consists of a contact tube which leads a welding wire during cleaning, and a tubular gas nozzle which surrounds the gas nozzle at a distance and conducts an inert gas. The gas nozzle is provided with a conically tapered gas tip. In addition, the contact tube is also conically tapered at the end in the form of a truncated cone.

This known cleaning apparatus is provided with a controlled, rotatably driven cleaning head that is equipped with at least one co-rotating cleaning element, as well as with a supply and centering device for a coaxial positioning of the gas nozzle with respect to the rotational axis of the cleaning head in the area of at least one cleaning element.

Specifically, the gas nozzle to be cleaned is inserted up to a stop into a rotationally fixed nozzle holder and it is thus centered. At the same time, flushing wings are introduced into the interior of the gas nozzle, which are slidably pressed while scraping with a rotating cleaning head against the outer surface of the contact tube and the inner surface of the gas nozzle. The surfaces are thus cleaned in this manner of traces of debris and of welding spatter. For the flushing wings are in this case preferably used spring-loaded scraper elements. In addition, a pivotably mounted angle Lever can be also used, whose scraper surface is pressed by centrifugal force radially to the interior part for cleaning of the contact tube. This angle lever is also coupled by means of a spring to another flushing wing which is used for cleaning the inner side of the gas nozzle. This specific arrangement does not appear to be practical because without a rotary movement and without centrifugal force, the flushing wing regions to be introduced into gas nozzle will be spread further than the nozzle opening, so that it is then not possible to introduce them inside without additional measures and without a collision with the gas nozzle when the gas nozzle is inserted into the nozzle holder.

In addition, CMT welding (derived from Cold Metal Transfer) is known as a special type of a protective gas process which can be used in particular as a CMT Braze+ process for CMT brazing welding in car body construction. An extremely narrow conical design of a gas nozzle is used for this purpose, wherein the protective gas exits at a high velocity and causes a constriction of the of the electric arc, so that a high welding speed can be achieved with a reduced gas consumption.

Due to the extremely conical design of such a gas nozzle, it is very difficult to reach for practical purposes the interior surfaces of the gas nozzle forming an undercut on the inner surfaces of the gas nozzle, and thus it is very difficult to clean them mechanically. Therefore, expensive ultrasonic cleaning is currently used. With robot-based welding, welding/soldering processes and process-integrated automatic cleaning is used with ultrasonic cleaning, which is particularly costly and complicated and requires high investment costs.

SUMMARY OF THE DISCLOSURE

The objective of the invention is therefore to further develop a cleaning apparatus for a mechanical cleaning of a gas nozzle of a protective gas welding torch, in particular a CMT+burner, in such a way that a simple mechanical cleaning is possible with a simple automation capability, as well as to provide a simple and cost-effective construction of the cleaning apparatus.

According to an exemplary embodiment, the cleaning apparatus is provided with a controlled, rotatably driven cleaning head that has at least one co-rotating cleaning element, as well as a supply and centering device for a coaxial positioning of the gas nozzle in the region of the cleaning element or elements. The cleaning element is in accordance with the invention provided with cleaning scissors having with two cleaning arms on which is suspended a pivot bearing, arranged transversely to the axis of rotation in a scissor-shaped, freely swinging state. On the cleaning arms are arranged centrifugal weights at the end region facing away from the gas nozzle, so that the cleaning scissors or their cleaning arms are spread open by the rotational force with a rotation of the cleaning head.

Furthermore, the cleaning arms are respectively provided with scraper structures of the upper regions facing the gas nozzles, which are introduced into the gas nozzle in the folded state of the cleaning scissors. When the cleaning scissors are spread open by the rotation of the cleaning head, the scraper structures slide on the inner face of the gas nozzle of the gas nozzle, which is held in a rotationally fixed manner, and pressed to it to perform a cleaning function with scraping. In particular the debris and the welding spatter can thus be removed in this manner.

The upper end regions of the scraper structures can be simply designed based on the scissors principle used here, so that they are smaller in the state of the cleaning scissors when they are folded together than the gas nozzle opening, thus permitting a simple automated introduction into the gas nozzle, or an installation in the gas nozzle. The spreading of the cleaning scissors and therefore also the associated cleaning operation is carried out in a simple manner solely by means of the rotation of the cleaning head and of the centrifugal force and the weight of the centrifugal force, without additional adjusting devices, so that both the construction of the apparatus as well as the operation can be carried out in a simple manner, functionally and cost-effectively.

The cleaning apparatus described above can be in principle used for different designs of a gas nozzle. The cleaning apparatus according to the invention is particularly suitable for a gas nozzle that is provided with an extremely conically tapered gas nozzle tip, such as those that are used in the CMT Braze+process. Specifically, the cleaning arms of the cleaning scissors should be designed as flat bar elements and the scraper structures should be in each case designed as scraper edges that are directed in the spreading direction, or as replaceable blades. These scraper edges or replaceable blades should be in this case formed in such a way that the rotating scraper edges introduced into the tip of the gas nozzle form a virtual rotational body corresponding to the inner surface of the conical gas nozzle, so that a full-surface construction and cleaning of the inner surface of the gas nozzle is possible.

Both the cleaning arms attached to the pivot bearing and, as the case may be, the scraper edges designed as blades, can be mounted interchangeably, so that different designs and adaptations to different gas nozzle forms are possible. In addition, different contact pressures can be set with different weights, in particular different centrifugal force weights, optionally in conjunction with different rotational speeds of the cleaning head, on the inner surfaces of the gas nozzle for different cleaning tasks.

In an advantageous further development, a scraper section protruding in the spreading direction is formed next to the scraping edge on the side facing away from the gas nozzle, or on a replaceable blade, or integrated on it. Such a scraper section is in each case arranged and formed in such a way that during a rotation of the cleaning head and with a positioned gas nozzle, it is slidably pressed for scraping and cleaning on the front side of the gas nozzle tip. Both the inner side of the gas nozzle and the front side thereof are thus cleaned with such an embodiment.

In order to apply a relatively high cleaning pressure in conjunction with a suitable spreading geometry, it is proposed that the lever arm parts of the cleaning arms, starting from the pivot bearing, should be substantially shorter, preferably by a factor from 2 to 5, than the lever arm parts facing away from the nozzle starting from the pivot bearing.

In order to reinforce the centrifugal forces that can be generated by means of the centrifugal force weights, the weights can be connected to the cleaning arms, preferably at the end regions which are bent in the spreading direction, by means of axes of rotation aligned parallel to the pivot bearing.

In a structurally simple, convenient and functional embodiment, the cleaning head can be designed as a hollow body with a cup-shaped or a cage-shaped design having a drive shaft that is arranged centrally at the bottom. Attached rotary drives that are per se known, as well as commercially available motors, in particular electric motors, or air motors or hydraulic motors can be used.

In such an embodiment, the cleaning scissors are arranged in the interior of the hollow body in the direction of the rotational axis. The hollow body is in addition provided with an upper wall having a central inlet opening through which the gas nozzle can be introduced with the conically tapered gas nozzle tip into the region of the scraper structures of the cleaning scissors in a defined position for cleaning.

It is advantageous when bristles that are directed radially inward, preferably plastic bristles, can be arranged to form a rotating bristle ring of a rotating brush ring of a plastic brush. The bristles are in this case advantageously designed with a bristle length which is adapted to the conicity of the gas nozzle, so that the rotating brush rests in the cleaning position of the gas nozzle flat against the outer surface of the gas nozzle and so that it is pressed to it for cleaning. With such an embodiment, the outer surface of the gas nozzle is thus also cleaned in addition to the inner surface of the gas nozzle and, if appropriate, also in addition to the front side of the gas nozzle.

In a particularly preferred further development of the invention, a centering aid component is in addition rotationally fixed on the upper wall, which is to say arranged and supported so that it is not rotating with the cleaning head. This centering aid component is provided with a central conical aid opening adapted to the outer surface of the conical gas nozzle in such a way that a predetermined defined cleaning position is achieved and held with a planar contact position of the gas nozzle in the centering aid opening. This predetermined cleaning position is adapted in conjunction with the geometry of the gas nozzle to the associated design of the cleaning scissors and its kinematics.

With automatic welding/soldering processes, the sequences of the movements are programmed and carried out by means of robots, while the welding torches and thus also the gas nozzles are arranged on the robot arms. It can therefore be advantageous when the cleaning apparatus can be started up also automatically according to predetermined welding/soldering cycles. It is in this case advantageous when an unsymmetrical or tilted retraction of the gas nozzle into its cleaning position by means of its projecting centering aid component is minimized/limited. In addition, the conically tapered centering opening for the gas nozzle acts as a stop in the direction of the insertion so that the immersion of the gas nozzle into the cleaning system is prevented, which could otherwise lead to blocking of the rotation movement and/or to excessive wear of the cleaning surfaces and/or of the scraper structures.

The centering aid component can also be advantageously used as a programming aid because this indicates to a programmer the correct cleaning position and switching position for switching on the rotary movement of the cleaning head.

The centering aid component can be advantageously a part of a torsion-proof outer container, which is also arranged above a dirt collecting tank.

The width of the scissors opening in the non-rotating basis position can be specified with a central scissors support.

As a further programming aid, the conical centering aid opening is not used directly; instead, an insertion funnel having a specified wall thickness is form-fittingly inserted into the centering opening based on a defined gap spacing between the centering aid opening and the inserted gas nozzle. Thanks to an improved view, the insertion funnel can be in this case formed from a half shell. This gap spacing can be in particular used as a switch-on point for the rotary drive of the cleaning head during programming, so that the cleaning surfaces can be advantageously rotated already shortly before the surfaces to be cleaned are processed with the rotational drive. Furthermore, this gap spacing can be used as a programmed height for supplying the gas nozzle to the cleaning head by means of a welding robot. During the operation (when the insertion funnel is removed), after this programming height has been reached, the reaching of the end position and of the cleaning position of the gas nozzle in the central aid component can be programmed at a low speed and so that a small force is applied, in particular to avoid damage.

A further measure to avoid damage to the cleaning device and/or to the gas nozzle can be realized depending on the special circumstances when the cleaning device, in particular the outer container, is flexibly connected in the direction of the introduction of the gas nozzle, in particular resiliently or on air bearings, to a stationary component. This stationary component can be for example a support frame that is used as a base part.

BRIEF DESCRIPTION OF THE DRAWING

The invention will be further explained with reference to drawings.

The drawings show the following.

DETAILED DESCRIPTION OF THE DRAWING

Figure 1:
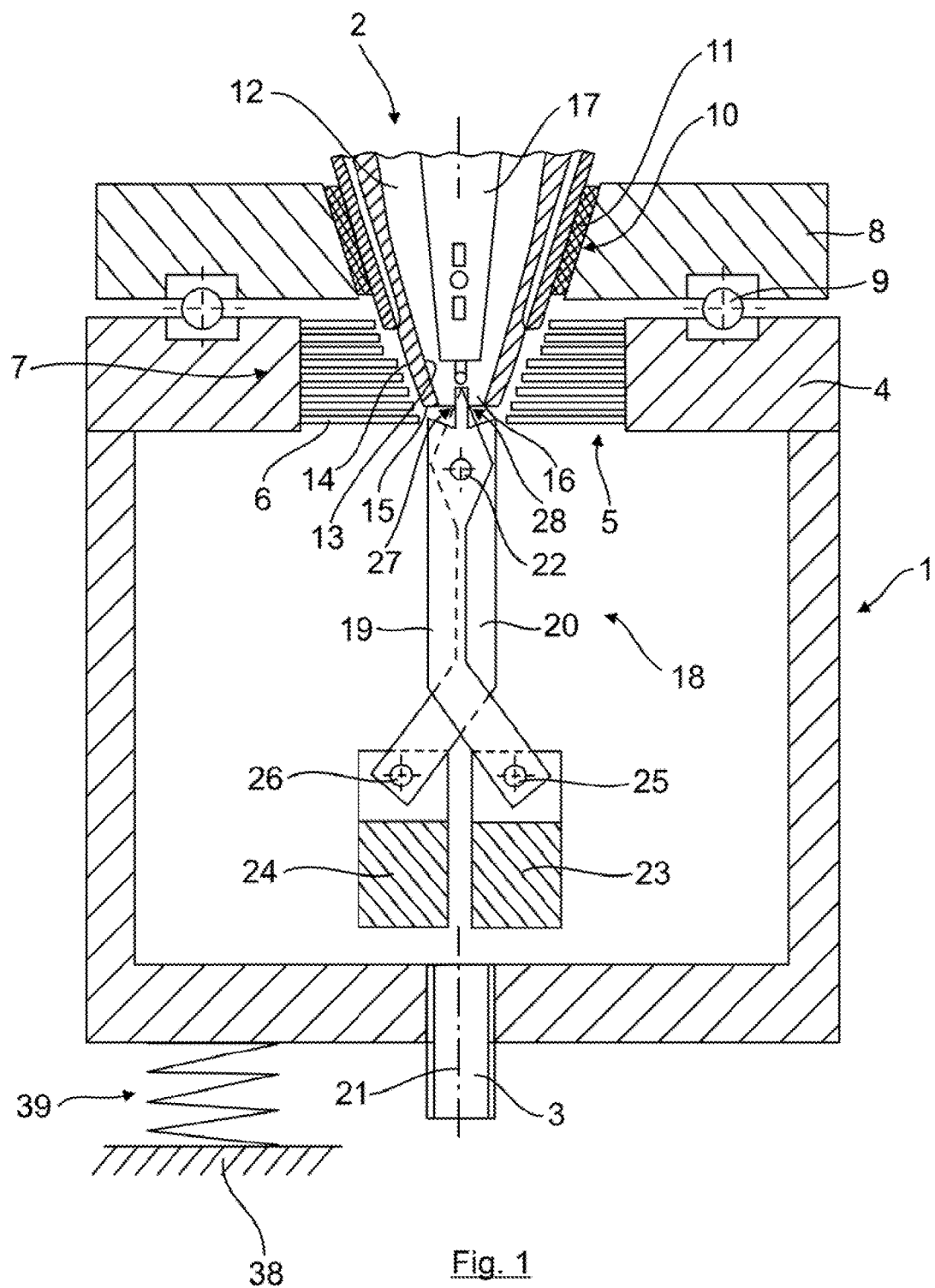
FIG. 1 A schematic longitudinal section through a cleaning head of a cleaning apparatus with an insertion funnel inserted in a centering component and a gas nozzle tip positioned therein, FIG. 2 a top view and a cross-sectional view through the centering aid component, FIG. 3 a top view and a cross-sectional view through a half shell of the insertion funnel, FIG. 4 a view of the cleaning head according to FIG. 1 with the same position of the gas nozzle tip without the insertion funnel before switching on a rotary drive, FIG. 5 a view according to FIG. 5 after switching on the rotary drive, FIG. 6 a view according to FIG. 5 with the gas nozzle tip in its fully retracted cleaning position in the centering aid component, and FIG. 7 a view according to FIG. 4 showing further additions and concrete details, in particular of the centering aid component.

FIG. 1 shows a cross-section through a cleaning head 1 of cleaning head apparatus, not shown, for mechanical cleaning of a gas nozzle 2 of a protective gas welding burner, in particular of a CMT+burner. The cleaning head 1 is designed as a cup-shaped or a cage-shaped cylindrical hollow body and it can be rotated by means of a controllable rotary drive (not shown) via a bottom-side central drive shaft 3. A top wall 4 of the cleaning head 1 is provided with a central introduction opening 5, and with a conically designed brush ring 7, which is formed with plastic bristles 6 directed radially toward the interior.

On the top wall 4 is mounted a centering aid component 8 by means of a ball bearing or tapered bearing 9 in such a way that during a rotation of the cleaning head body, the centering aid component 8 is held in a rotationally fixed manner by a connection, not shown, to a stationary frame or housing.

Figure 3:
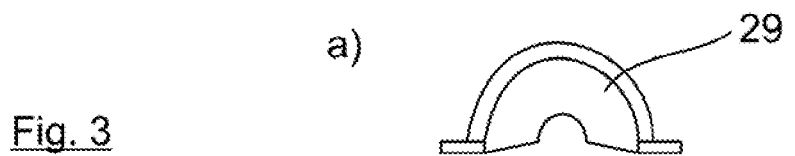
Figure 3:
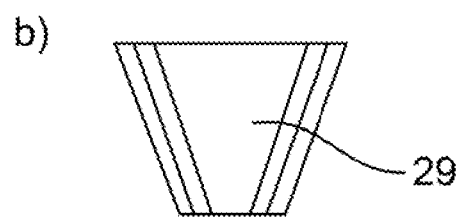

The centering component 8 is provided with a centering aid opening 10, which is tapered conically downward and form-fittingly inserted into an insertion funnel 11 (see FIG. 3). In the insertion funnel 11 is inserted, once again form-fittingly, the gas nozzle 2 with its strongly conically tapered gas nozzle tip 12.

The gas nozzle tip 12 has at its open front end region a gas nozzle inner surface 13 to be cleaned, a gas nozzle outer region 14 and a gas nozzle end surface 15. In this gas nozzle 2 is in addition centrally arranged a contact tube 17, which reaches just in front of the gas nozzle opening 16.

For cleaning the gas nozzle 13, cleaning scissors 18 are employed as a cleaning element with two cleaning arms 19, 20 which are suspended in the form of freely swinging scissors on a pivot bearing 22 of the cleaning head 1, arranged transversely to the axis of rotation 21.

The cleaning arms 19, 20 are mutually expandable flat rod elements that are provided with end regions bent in the direction of the expansion on which are mounted respective centrifugal force weights 23, 24, which are freely swinging by means of pivot axes 25, 26 axially parallel to the pivot bearing 22.

As one can see from the figure, the upper lever arm parts of the cleaning arms 19, 20 protruding from the pivot bearing 22 are substantially shorter that the lower lever arm parts of the cleaning arms 19, 10 facing away from the gas nozzle.

The cleaning arms 19, 20 are provided at the upper end region facing away from the gas nozzle with respective scraper structures 27, 28, whose design and function are explained in more detail in connection with FIG. 6. As can be seen in any case from FIG. 1 (and FIG. 4), the scraper structures 27, 28 can be introduced into the gas nozzle opening 16 in the illustrated base position of the cleaning scissors (without rotation of the cleaning head 1).

Figure 2:
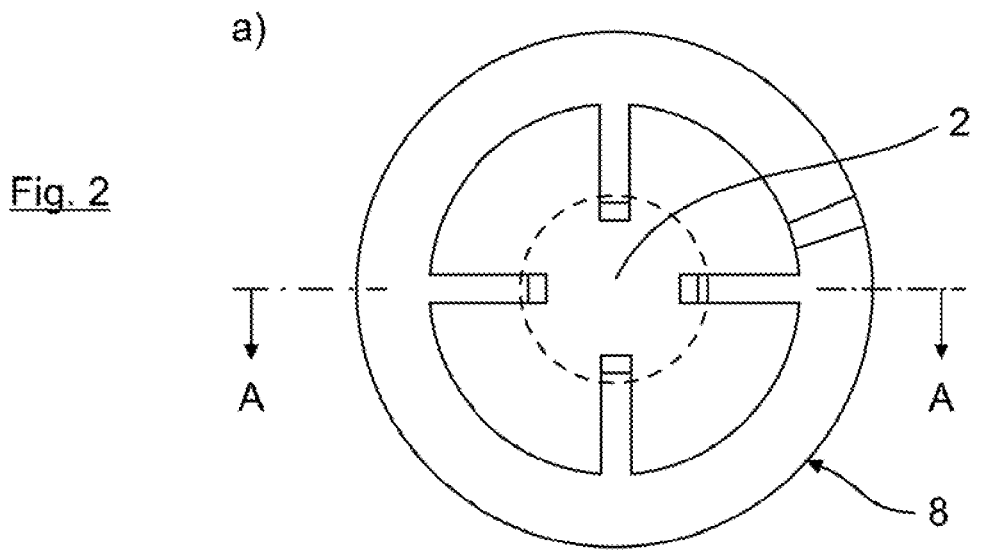
Figure 2:
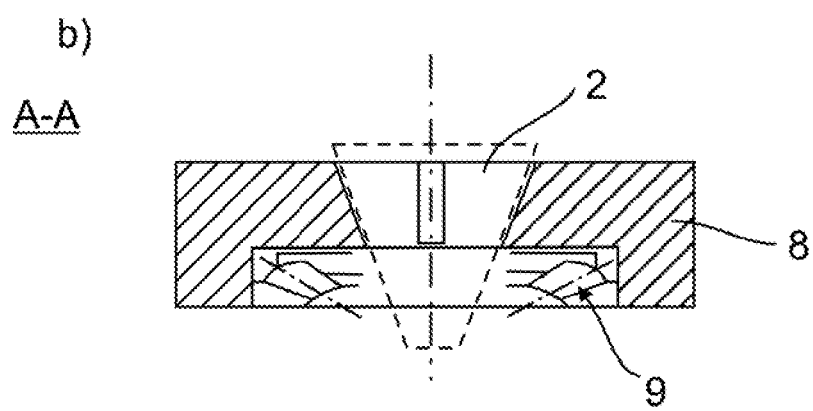

FIG. 2a shows a top view illustration of a centering aid component part 8 having a ring-shaped design that is provided with a gas nozzle 2 centrally located on a support cross. FIG. 2b shows a cross-section along the line A-A, in which is schematically indicated a bearing ring 9, by means of which the centering aid component 8 is rotationally fixed with respect to the rotating cleaning head 1. A good view can be obtained in particular for the programming of the gas nozzle 2 thanks to the free spaces between the struts.

FIG. 3a shows a top view and FIG. 3b shows a side view of the insertion funnel 11 which is designed as a half-shell 29.

Figure 4:
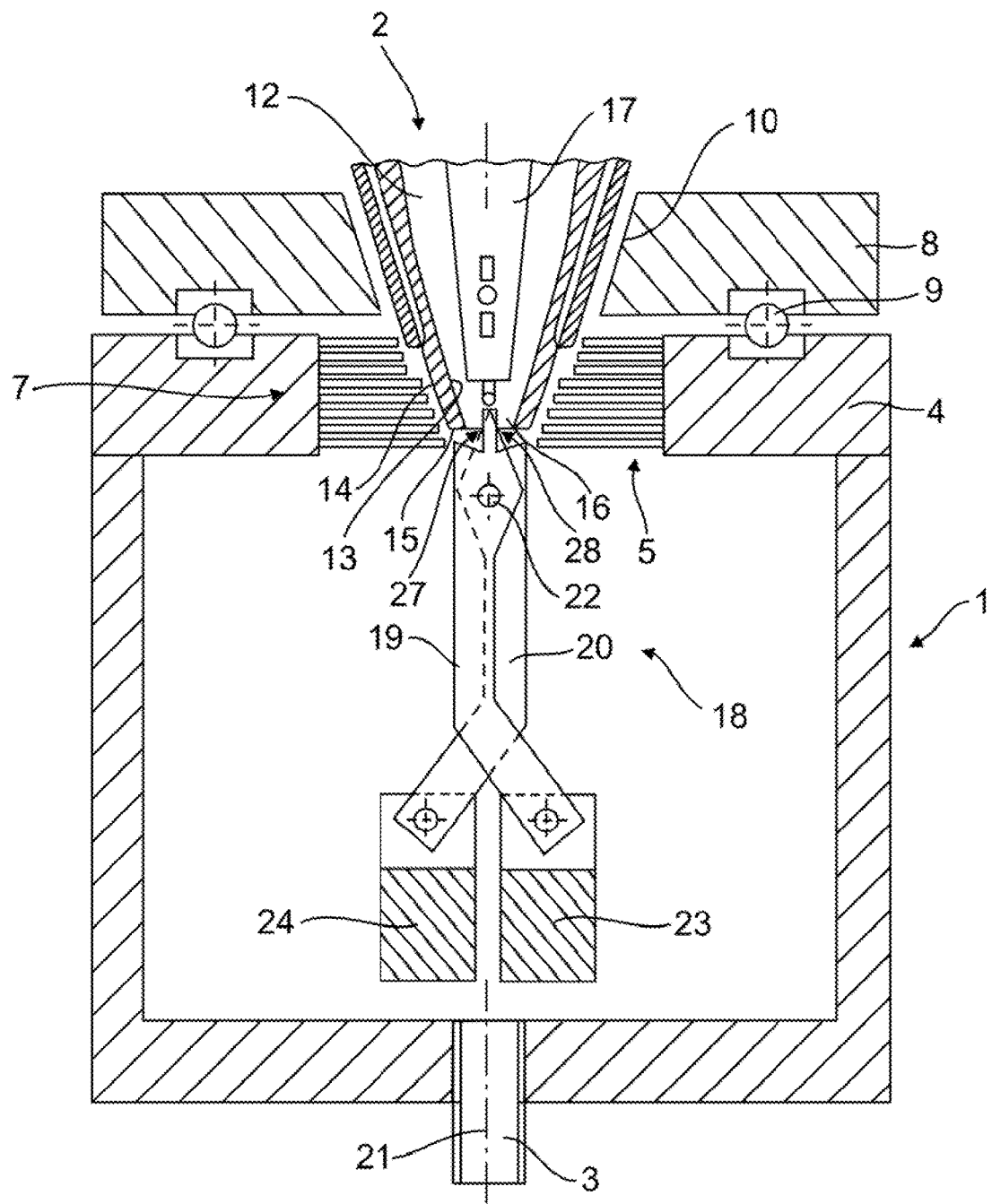

FIG. 4 corresponds to FIG. 1, wherein in the case of the illustrated operation, the gas nozzle 2 has been inserted in the position corresponding to FIG. 1 by a robot, with the funnel 11 removed, into the centering aid component 8. A switch-on point for automatic insertion of the drive motor (not indicated) or of a rotary drive of the cleaning head 1 is established with the aid of the insertion funnel 11 and the gas nozzle position defined by it.

Figure 5:
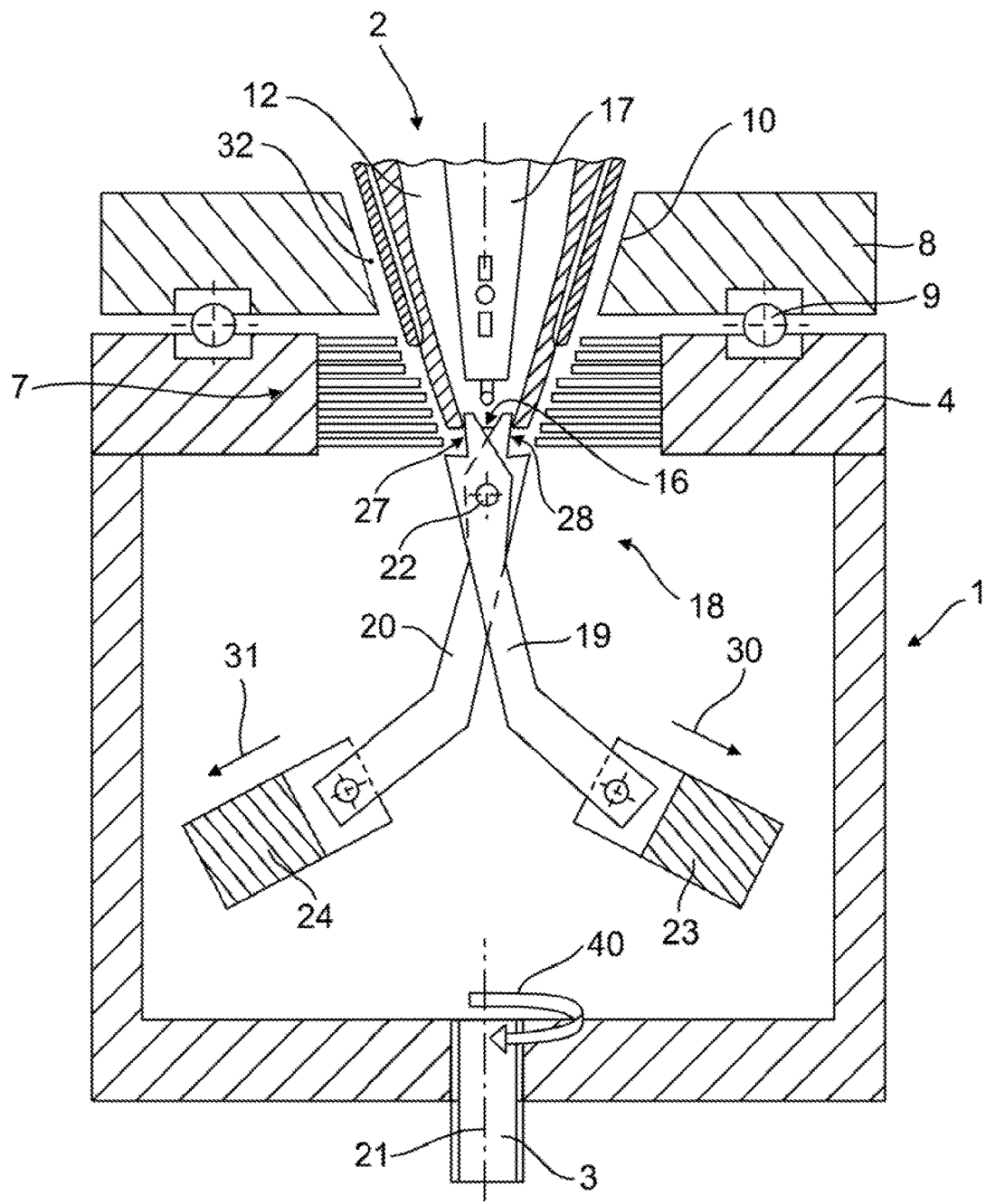

FIG. 5 shows the state shortly after switching on the rotary drive while the cleaning head 1 is already rotating (rotation arrow 40). The pivot bearing 22 is rotationally attached to the cleaning head 1 so that the centrifugal force acts as a result of the rotation on the centrifugal weights 23, 24 (arrows 30, 31) and the cleaning scissors 18 with the cleaning arms 19, 20 are thus spread apart. In this manner, the upper regions of the scraper structures 27, 28 already come to rest on the gas nozzle opening 16, although the gas nozzle tip 12 is not yet form-fittingly inserted in the centering opening 10 and instead it is still located at a defined gap spacing 32, which was used as a switch-on position of the rotary drive.

Figure 6:
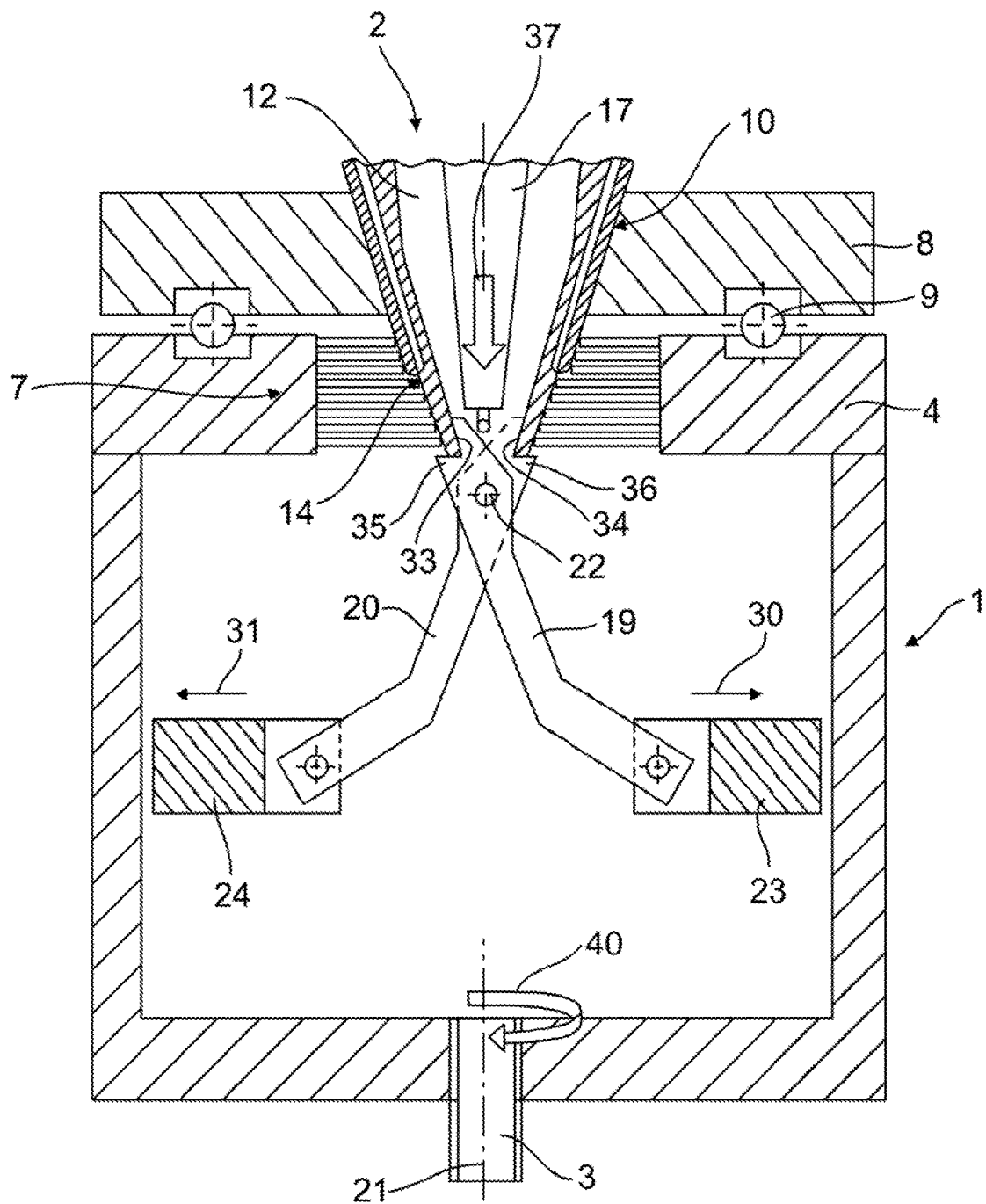

As shown in FIG. 6, the gas nozzle tip 12 has already been completely form-fittingly inserted by a robot into the conical centering opening 10 in the direction of the axis of rotation 21 with an already rotating cleaning head 1.

In this manner, the brush ring 7 is employed for a cleaning of the gas nozzle outer surface 16.

FIG. 6 clearly shows the concrete design of the scraper structures 27, 28 in their functional position. For cleaning the gas nozzle inner surface 13 in the end region of the gas nozzle tip 12, scraper edges 33, 34 are attached to the cleaning arms 19, 20, which are positioned in such a way that a virtual conical rotary body is formed when the cleaning head 1 is rotating, which corresponds to the conicity of the gas nozzle inner surface 13 to be formed when the gas nozzle tip 12 is form-fittingly inserted into the centering aid opening 10 and the cleaning scissors 18 are accordingly spread apart as shown in FIG. 6.

In addition, scraper sections 35, 36 are provided on the respective scraper edges 33, 34 projecting into the spreading direction, arranged in such a manner that they rest against the gas nozzle end face 15 for the cleaning in the cleaning position of the gas nozzle tip 12 illustrated in FIG. 6.

After a predetermined rotational time and thus also cleaning time of the cleaning head 1, the gas nozzle 2 can be moved back again supported by a robot against the introduction direction (introduction arrow 37) and it is thus prepared for another predetermined number of welding cycles, after which cycles the gas nozzle 2 is again supplied supported by a robot to the cleaning apparatus.

Depending on the circumstances, the cleaning head 1 can be resiliently supported by the centering component 8 with respect to a fixed support 38 for a safe prevention of damage during the introduction of the gas nozzle 2, as illustrated schematically in FIG. 1, by a spring 39.

Figure 7:
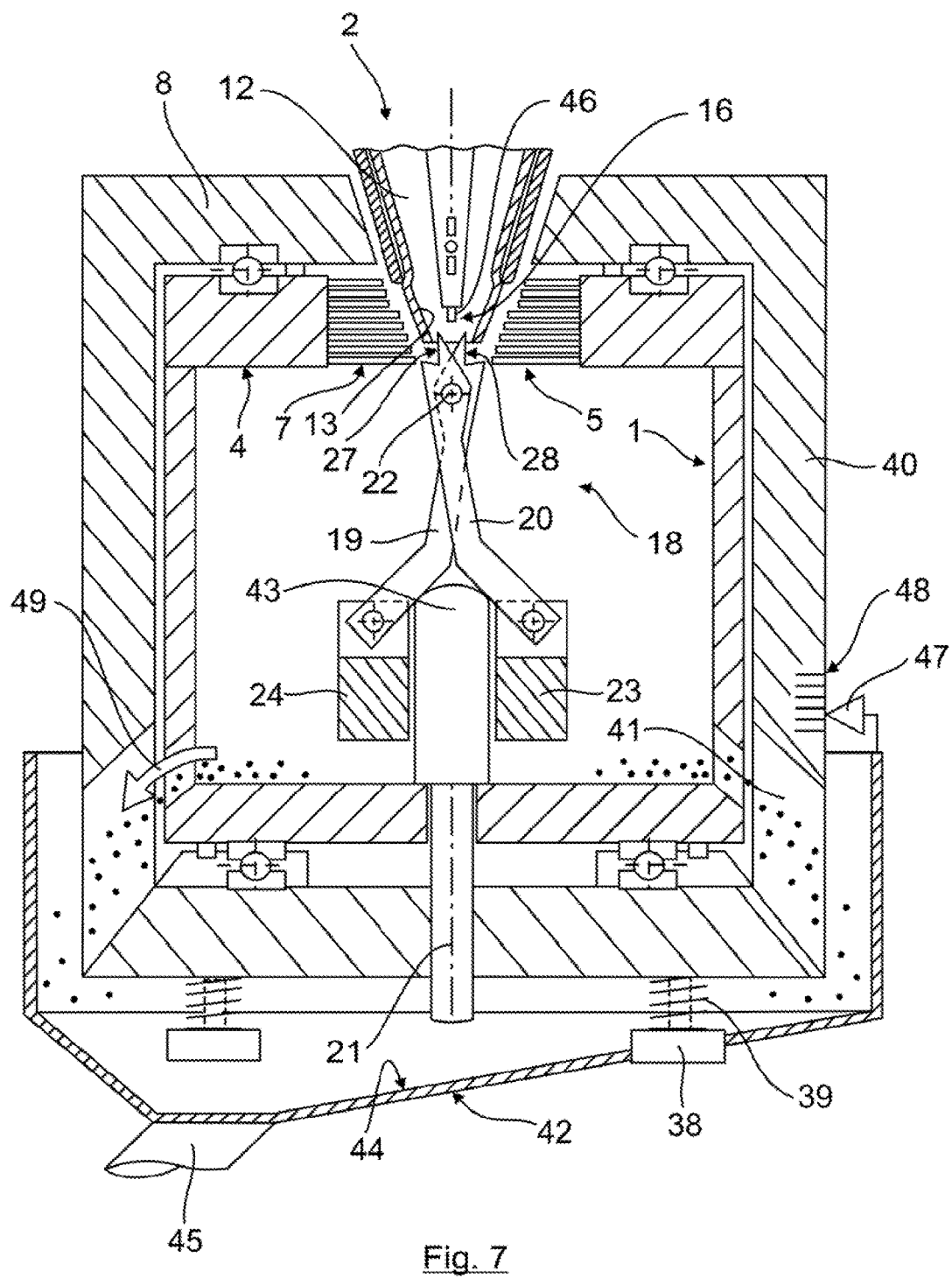

FIG. 7 shows a view of a cleaning apparatus that is provided with additions and further concrete details, in particular of the centering aid component 8 in a state before the rotary drive is switched on, while the cleaning head 1 is not rotating, approximately corresponding to FIG. 1. The centering aid component 8 is a component part of a rotationally fixed outer container 40 surrounded by a cleaning head 1, in which the cleaning head 1 is rotatably mounted. Centrifugal force is applied laterally with the rotating cleaning 1 (arrow 49). The outer container 40 is in this case formed with a cup-shaped design and it is provided on the side walls with wall opening 41 for removal of dirt to a dirt collection tank 42, which is arranged under the outer container 40. The dirt collection tank 42 is equipped with an integrated chute 44 for the accumulated dirt that is discharged into a discharge tube 45.

The rotationally fixed outer container 42 serves on the one hand as a holder and as a support for the cleaning head 1, and on the other hand as a work and contact protection for the cleaning head 1 rotating therein. For this purpose, the outer container can be designed as enclosed in the form of a cup or in the form of a closely mashed cage.

Furthermore, a central, preferably replaceable scissor support 43 is arranged in the cleaning head 1, with which the width of the scissor opening is preset in the base position when the cleaning head 1 is not rotated. For this purpose, the lower regions of the cleaning arms 19, 20 are already slightly spread open at the upper, arched end of the scissor support 43, so that the end regions facing the upper gas nozzle are spread with the scraper structures 27, 28 to the extent that they can be on the one hand introduced into the gas nozzle opening 16, while on the other hand they cannot collide with a welding wire 46. The scissors support 43 can be provided with different shapes to fit the scissors geometry to different gas nozzles 2 and so that it can be exchanged.

The outer container 40 is in this case flexibly supported vertically in the insertion direction of the gas nozzle 2 by means of springs 39 on stationary base parts 38 (as was already schematically indicated in FIG. 1). In this manner, the counterforce can be supported with the gas nozzle 2 inserted in the centering aid component 8 for a firm support and for safe prevention of damage. A stationary marking arrow 47, which is here fixed to the stationary dirt collection tank 42, can be used in conjunction with a measuring scale 48 on the outer container 40 for a determination of the spring counterforce.

The invention claimed is:

1. A cleaning apparatus for a mechanical cleaning of a gas nozzle of a protective gas welding burner, comprising:
a controlled, rotatably driven cleaning head having at least one co-rotating cleaning element, and
a supplying and centering device to provide a coaxial position of the gas nozzle with respect to the rotational axis of the cleaning head in the region of at least one cleaning element,
wherein the cleaning element are cleaning scissors with two cleaning arms, which are arranged suspended so as to form scissors that are freely swinging on a pivot bearing transversely to the axis of rotation in the cleaning head,
wherein on the cleaning arms are arranged centrifugal weights at an end region facing away from the gas nozzle, the centrifugal weights are situated on the end regions of the respective cleaning arms on respective pivot axes, such that the centrifugal weights freely swing about the respective pivot axes, so that with a rotation of the cleaning head, the cleaning arms are spread open and the centrifugal weights move radially outward with respect to the pivot bearing,
wherein the cleaning arms are provided with respective scraper structures facing away from the gas nozzle, which are introduced in a folded state of the cleaning scissors into the gas nozzle and which, when the cleaning scissors are spread open, are pressed with a rotation of the cleaning head to a gas nozzle inner surface of the gas nozzle held in a rotationally fixed manner so that they are pressed to it in a sliding and scraping manner.

2. The cleaning apparatus according to claim 1, wherein the gas nozzle is an extremely conically tapered gas nozzle tip provided with a correspondingly undercut, conical gas nozzle inner surface, and
wherein the cleaning arms are flat bar elements and the scraper structures are designed as scraper edges oriented in a spreading direction, or as replaceable blades,
wherein the rotating scraper edges form in the state introduced into the gas nozzle tip a virtual rotating body for a full-surface cleaning corresponding to the conical gas nozzle inner surfaces.

3. The cleaning device according to claim 2, wherein a scraper section is formed next on the scraper edge projecting in the spreading direction facing away from the gas nozzle side, and
wherein each rotating scraper section is pressed thereupon for cleaning the end face of the gas nozzle tip with sliding and scraping.

4. The cleaning device according to claim 1, wherein upper lever arm parts of the cleaning arms extending from the pivot bearing are shorter than lower lever arms facing away from the gas nozzle, starting from the pivot bearing.

5. The cleaning device according to claim 1, wherein the centrifugal force weights are freely swinging with the cleaning arms, the end regions that are bent in the spreading direction by means of the pivot axes of the cleaning arms.

6. The cleaning apparatus according to claim 2, wherein the cleaning head is designed as a cup-shaped or as a cage-shaped hollow body with a drive shaft arranged centrally on the base,
wherein the cleaning scissors are arranged in an interior of the hollow body in a direction of the axis of rotation, and
wherein the hollow body is provided with an upper wall having a central introduction opening, through which the gas nozzle can be introduced with the conically tapered gas nozzle tip into a region of the scraper structures of the cleaning scissors in a defined cleaning position.

7. The cleaning apparatus according to claim 6, wherein plastic bristles directed inward, are arranged on the upper wall in the region of the introduction opening for the formation of a rotating brush ring of a plastic brush, which lie flat in the cleaning position of a gas nozzle on the gas nozzle outer surface for a surface cleaning with the rotating brush ring, wherein the contact surface of the brush ring is adapted to the conicity of the gas nozzle tip by means of a corresponding bristle length.

8. The cleaning apparatus according to claim 7, wherein on the upper wall is arranged and mounted a centering aid part in a rotationally stable manner, which is to say not co-rotating, which is provided with a central centering aid opening adapted to the conical gas nozzle outer surface in such a way with a flat surface contact of the gas nozzle in the centering aid opening, a predetermined, defined cleaning position is reached and maintained.

9. The cleaning apparatus according to claim 8, wherein an insertion funnel can be form-fittingly inserted at a defined interval with a specific wall thickness between the centering aid opening and an inserted gas nozzle, which is formed from an inserted half shell, wherein this interval is used as a switch-on point for the rotary drive of the cleaning head and as a programming height for supplying the gas nozzle to the cleaning head by means of a welding robot.

10. The cleaning apparatus according to claim 8, wherein the centering aid part is a component part of an outer container, which is surrounding in a rotationally fixed manner the cleaning head, while being rotatably mounted in the cleaning head, wherein the outer container is optionally provided with at least one wall opening for removal of dirt into a dirt collecting tank.

11. The cleaning device according to claim 1, wherein in the cleaning head is arranged a central replaceable scissor support, by which the opening width of the scissors is predetermined when the cleaning head is not rotating.

12. The cleaning apparatus according to claim 10, wherein the cleaning apparatus, in particular the outer container, is connected vertically, in the direction of the introduction of the gas nozzle and in particular resiliently, with a spring, or with air bearings to a stationary base part.

\* \* \* \* \*